United States Patent [19]

Sueoka

[11] Patent Number: 4,873,599
[45] Date of Patent: Oct. 10, 1989

[54] MAGNETIC HEAD ASSEMBLY FOR PERPENDICULAR MAGNETIC RECORDING

[75] Inventor: Kuniaki Sueoka, Kawasaki, Japan

[73] Assignee: International Business Machines Corporation, Armonk, N.Y.

[21] Appl. No.: 192,416

[22] Filed: May 10, 1988

[30] Foreign Application Priority Data

May 15, 1987 [JP] Japan .................................. 62-117267

[51] Int. Cl.$^4$ ...................... G11B 5/147; G11B 5/187; G11B 5/23
[52] U.S. Cl. .................................... 360/126; 360/119; 360/122
[58] Field of Search ................ 360/126, 125, 119, 122

[56] References Cited

U.S. PATENT DOCUMENTS

| | | | |
|---|---|---|---|
| 4,631,612 | 12/1986 | Shiiki et al. | 360/125 |
| 4,740,855 | 4/1988 | Diepers et al. | 360/126 |
| 4,764,833 | 8/1988 | Imamura et al. | 360/126 |
| 4,771,350 | 9/1988 | Desserre | 360/126 |
| 4,807,076 | 2/1989 | Nakashima et al. | 360/126 |

Primary Examiner—Robert S. Tupper
Attorney, Agent, or Firm—Otto Schmid, Jr.

[57] ABSTRACT

A magnetic recording head assembly for perpendicular magnetic recording for the type in which both the main magnetic pole and auxiliary magnetic pole are on the same side of the magnetic medium. The auxiliary magnetic pole is made from a material having the property that the permeability varies in direction of relative movement between the magnetic recording medium and the magnetic head assembly, with the permeability progressively increasing from each edge to the center of the auxiliary magnetic pole.

6 Claims, 3 Drawing Sheets

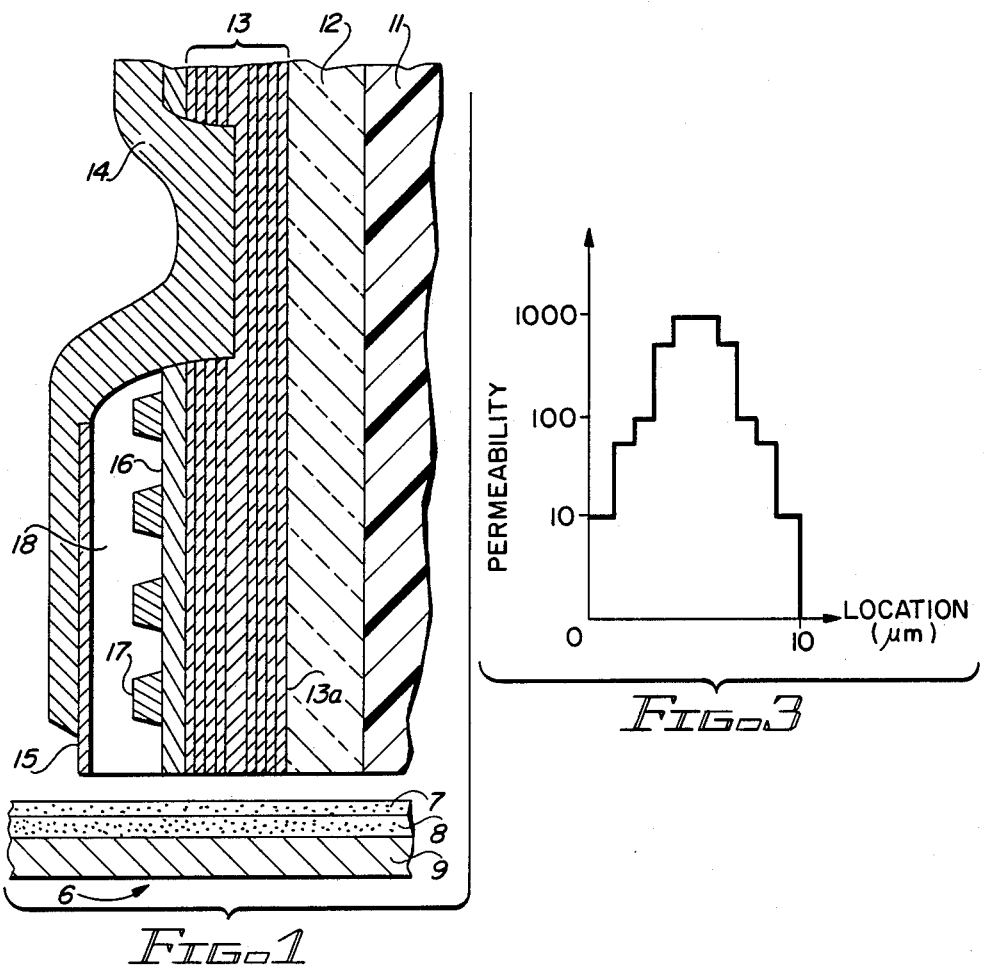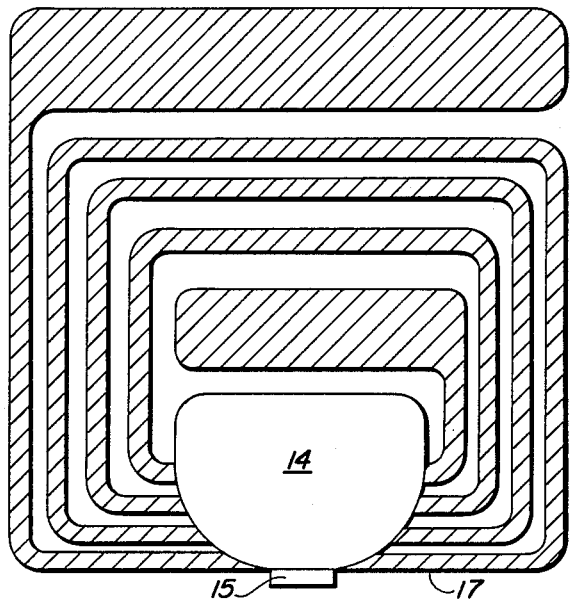

MAGNETIC HEAD ASSEMBLY FOR PERPENDICULAR MAGNETIC RECORDING

BACKGROUND OF THE INVENTION

1. Field of the Invention

This invention relates to a magnetic head assembly for perpendicular magnetic recording, and more particularly to a magnetic head assembly of the type having magnetic poles on only one side of the magnetic recording medium.

2. Description of the Prior Art

Demands for high density recording are increasing in response to increased amounts of information. In the field of magnetic recording, perpendicular recording systems have been proposed to meet such requirements, and are presently being studied. In perpendicular recording systems, recording is performed in the thickness direction of the recording medium, and unlike conventional in-plane magnetic recording systems, demagnetizing fields do not increase even under a high density recording condition, thus written recording patterns are not demagnetized, and better quality recording can be achieved.

FIG. 7 shows a typical example of conventional perpendicular read/write magnetic head assemblies proposed before (National Convention Record, 1983 the Institute of Electronics and Communication Engineers of Japan, Part 1, p195). This magnetic head assembly has magnetic poles on only one side of the recording medium, and is of the so-called single magnetic pole type. In this type of magnetic head assembly, a recording medium does not need to be supported between the magnetic poles and this arrangement provides good handling. In FIG. 7, a nonmagnetic substrate 1 is provided with a main magnetic pole 2, and an magnetizing core 3 is formed on the main magnetic pole 2. Around the non-magnetic substrate 1, the main magnetic pole 2 and the magnetizing core 3, a read/write coil 4 is wound. An auxiliary magnetic pole 5 is connected onto the end of the magnetizing core 3, which constitutes the return path.

The recording medium 6 may be composed, for example, of a perpendicular magnetizing film 7, a high-permeability magnetic layer 8 and a substrate 9.

In such perpendicular magnetic recording, the magnetization volume of each recording pattern in the magnetic recording medium decreases with the increase of recording density. For this reason, an efficient magnetic head is required. Also, in high density recording, since the information transfer speed is high, the high frequency characteristics of the magnetic head assembly must be improved.

In order to improve the efficiency of the arrangement of FIG. 7, the distance "a" between the magnetizing core 3 and the leg of the auxiliary magnetic pole 5 can be decreased, the width "b" of the leg of the auxiliary magnetic pole 5 can be increased, or the distance "c" between the end of the leg of the auxiliary magnetic pole 5 and the recording medium 6 can be decreased. In these cases, however, pulse noise caused by the edge of the auxiliary magnetic pole 5 facing the recording medium 6 increases and as a result the error rate of the system becomes higher. Also, in order to improve the high frequency characteristics of the magnetic head assembly, the inductance of the auxiliary magnetic pole 5 can be decreased. This can be accomplished by decreasing the distance "a" to decrease the volume of the auxiliary magnetic pole 5. However, even if these changes are made, it is still difficult to obtain an optimum magnetic head in terms of pulse noise.

SUMMARY OF INVENTION

Accordingly, it is an object of this invention to provide a magnetic head assembly of a single magnetic pole type for perpendicular magnetic recording, which solves the problems of pulse noise caused by the edge of the auxiliary magnetic pole without sacrificing magnetic path efficiency and high frequency characteristics.

According to this invention, in order to achieve the above object, the local permeability of the auxiliary magnetic pole is varied along the direction of relative movement of the magnetic head assembly and the magnetic recording medium so that the permeability progressively increases from each edge to the center of the auxiliary magnetic pole. Variation of permeability can be produced by treatment by ion beams, changes in stress, or changes in composition of the magnetic material. When the auxiliary magnetic pole is constructed by thin film lamination, the permeability of each thin film can be chosen based on the position of each thin film in the auxiliary magnetic pole structure.

In such a structure, the generation of pulse noise can be reduced, and designs with higher efficiency and improved high frequency characteristics can be achieved.

The foregoing and other objects, features and advantage of the invention will be apparent from the following more particular description of a preferred embodiment of the invention as illustrated in the accompanying drawings.

BRIEF DESCRIPTION OF THE DRAWINGS

FIG. 1 is a cross-sectional view of a magnetic head assembly embodying the present invention.

FIG. 2 is a plan view of the magnetic head assembly of FIG. 1.

FIG. 3 is a diagram illustrating the permeability profile of the auxiliary magnetic pole of the magnetic head assembly of FIGS. 1 and 2.

DESCRIPTION OF THE PREFERRED EMBODIMENTS

Figure 4:
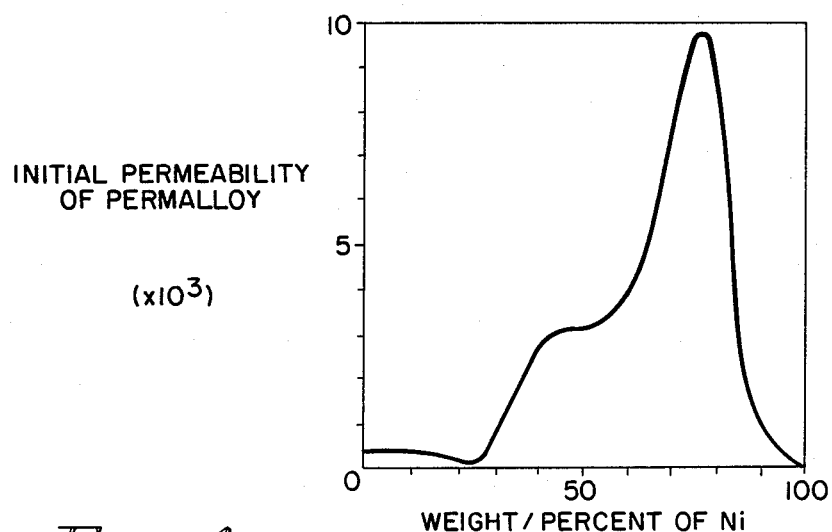
FIG. 4 is a graph illustrating the permeability of permalloy as a function of the percent nickel (ni) in the alloy.

A preferred embodiment of this invention will be described referring to the drawings.

In FIGS. 1 and 2, the components of the magnetic head assembly are deposited successively on substrate 11, which may be a ceramic material comprising a mixture of TiC and $Al_2O_3$, for example. An insulation layer 12 which may comprise $Al_2O_3$, for example, is deposited on substrate 11, and an auxiliary magnetic pole 13 is made from a suitable high permeability magnetic material It is a feature of the present invention that the magnetic material has the property that the permeability varies across the thickness of the auxiliary magnetic pole 13, i.e. along the direction of relative motion between the magnetic head assembly and the magnetic recording medium. The preferred variation of permeability is chosen so that the permeability is least at each edge of the auxiliary magnetic pole and progressively increases toward the center of the pole where the permeability is greatest.

In the embodiment shown in FIGS. 1 and 2 the auxiliary magnetic pole 13 comprises, for example, one of the series of high permeability nickel-iron magnetic alloys known as permalloy, and is formed by laminating a plurality of thin permalloy films 13a sequentially. The outer permalloy films 13a have the lowest permeabilities, with the permeability of each succeeding film 13a increasing until the highest permeability is reached in the center film 13a.

The resulting permeability distribution is shown in FIG. 3 for this embodiment. A similar permeability distribution can be obtained by a treatment using ion beams, by stress or by varying the alloy composition. As an example of varying the alloy composition the quantity of Ni in permalloy is changed, its permeability varies as FIG. 4 shows. This figure shows that permeability distribution similar to that shown in FIG. 3 can be obtained by controlling the Ni content. This can best be accomplished by varying the compositions of the film forming magnetic materials used in sputtering or plating processes to form the auxiliary magnetic pole.

The magnetizing core 14 is magnetically connected to the auxiliary magnetic pole 13, and the main magnetic pole 15 is in turn magnetically connected to the magnetizing core 14. The magnetizing core 14 and the main magnetic pole 15 may comprise permalloy, for example, and particularly, the main magnetic pole 15 has a high saturation magnetic flux density. The auxiliary magnetic pole 13 is coupled magnetically to the conductor coil 17 which is electrically insulated from auxiliary magnetic pole 13 by means of insulation layer 16 made of $Al_2O_3$, for example. The spacer 18, consisting of photoresist, for example provides electrical insulation between the coil 17, the magnetizing core 14, and the main magnetic pole 15.

The feature of the shape of this magnetic head assembly is that the end face of the auxiliary magnetic pole 13 is positioned at the same distance from the recording medium as the end face of the main magnetic pole 15. Thus, the end face of the auxiliary magnetic pole 13 can be positioned very close to the recording medium 6. Consequently, flux from the main magnetic pole 15 can be returned efficiently, and the length of the magnetic path can be reduced. Also, the end face of the auxiliary magnetic pole 13 is made flat. This results in a simplification of mask alignment for forming thin films 13a.

When a flat end face of the auxiliary magnetic pole is adopted without further improvement, pulse noise caused by the edge of auxiliary magnetic pole 13 will increase. In the present invention, the permeability profile as shown in FIG. 3 is adopted to solve such a problem.

For fabrication of such a magnetic head assembly, the substrate 11 is first coated with the insulation layer 12. The films 13a, composing the auxiliary magnetic pole 13, are sequentially laminated on the insulation layer 12. The auxiliary magnetic pole 13 is in turn coated with the insulation layer 16, and coil 17 is formed on insulation layer 16 using a thin film patterning technique. A photo-resist is then deposited and portions of the photo-resist not required are removed using a photo-lithography technique and the spacer 18 is thereby formed. Next, an opening is made in the auxiliary magnetic pole 13 using a dry etching technique at the location where the auxiliary magnetic pole 13 is connected to the magnetizing core 14. A permalloy film is then formed and patterned to produce the main magnetic pole 15. Finally, the magnetizing core 14 is formed. Although it is not shown in the drawings, a protective layer is finally provided.

Figure 5A:
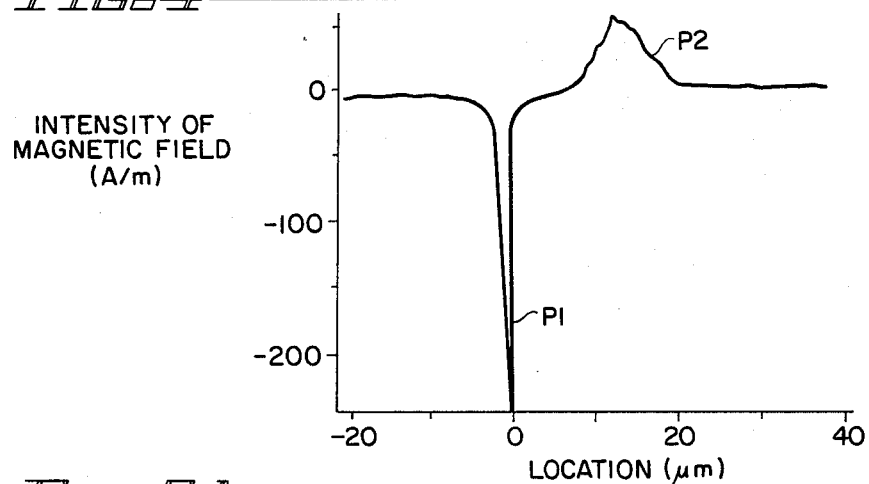
FIGS. 5A and 5B are diagrams illustrating the profiles of magnetic fields formed by the magnetic head assembly of the above embodiment of the present invention and a comparative prior art magnetic head assembly, respectively.

FIG. 5A shows the profile of the magnetic field formed by the magnetic head assembly constituted as described above. The steep peak P1 in the negative direction corresponds to the main magnetic pole 15. The much smaller peak P2 in the positive direction corresponds to the auxiliary magnetic pole 13. The peak P2 has fine fluctuations, which are caused by the interfaces between thin permalloy films 13a.

Figure 5B:
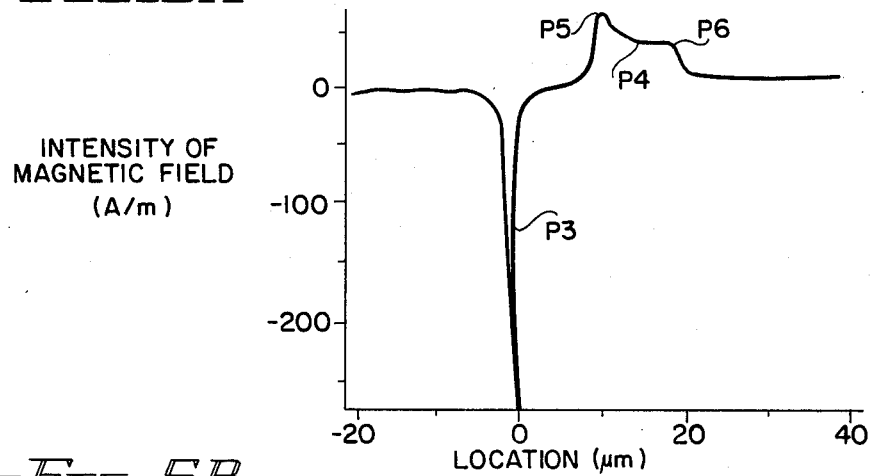
Figure 7:
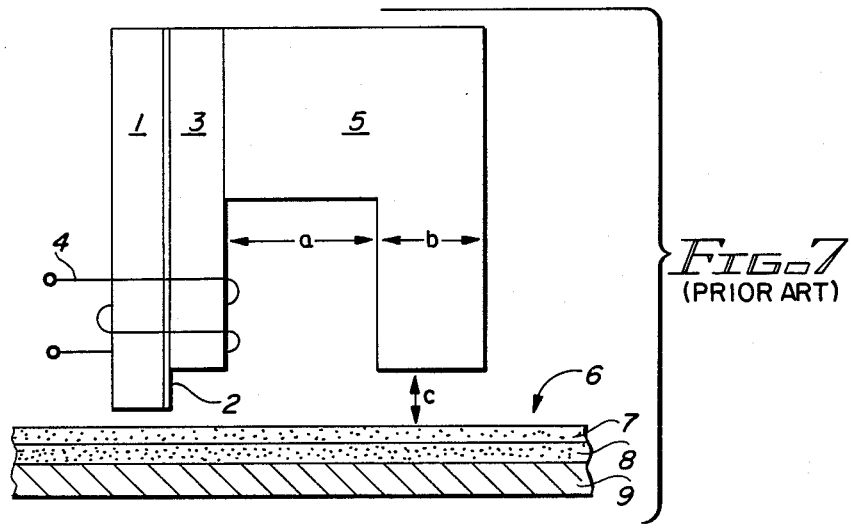
FIG. 7 is a diagram illustrating a prior art magnetic head assembly.

FIG. 5B shows the profile of the magnetic field obtained by a magnetic head assembly constituted using an auxiliary magnetic pole 13 with a uniform permeability such as that shown in FIG. 7, for example. Peak P3 corresponds to the magnetic pole 15 as in FIG. 5A. The peak P4 corresponds to the auxiliary magnetic pole 13. In this example, steep peaks P5 and P6 caused by the edge of the auxiliary magnetic pole 13 are overlapped onto the peak P4. The reason why such peaks P5 and P6 are not present in FIG. 5A is that the permeability in the auxiliary magnetic head 13 is spatially varied over its width.

When a magnetic head assembly having the characteristics shown in FIG. 5B is used, pulse noise caused by peaks P5 and P6 occurs in the read signals. This noise changes the location of the information bit pulse, that is, the noise causes peak shift, which increases the error rate.

Figure 6A:
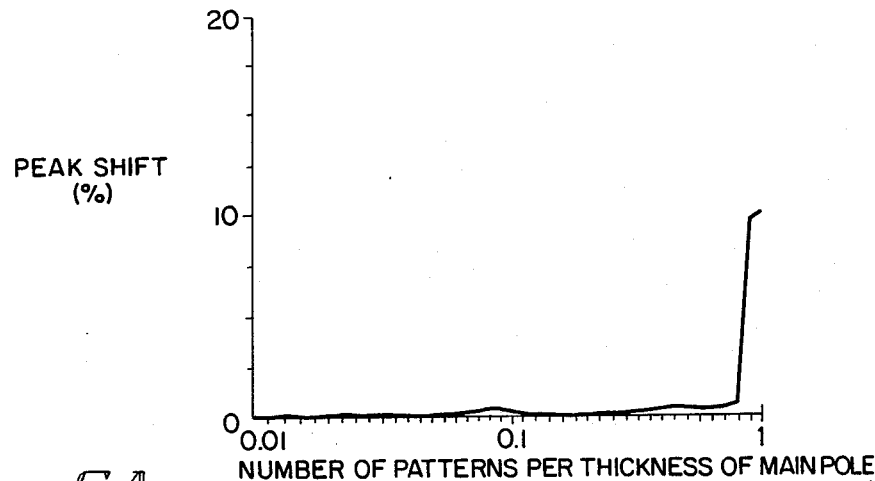
FIGS. 6A and 6B are diagrams illustrating the amounts of peak shift by the above embodiment of the present invention and a comparative prior art example, respectively.
Figure 6B:
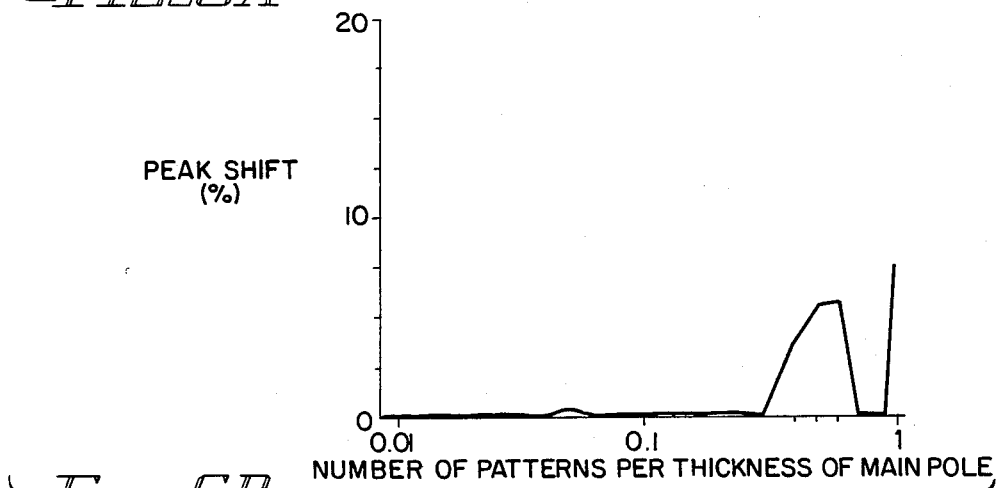

FIG. 6B shows the peak shift when an all-1 pattern is recorded using a magnetic head assembly having the characteristics shown in FIG. 5B. As is obviously seen in FIG. 6B, the amount of peak shift increases rapidly when the number of patterns written per the thickness of the main magnetic pole (0.5 m) increases to about 0.3 (15 KBPI). In direct contrast, the magnetic head assembly of the present invention has a small amount of peak shift until the number of patterns increases to about 0.8 (40 KBPI), as FIG. 6A shows, and few errors occur even in high density recording.

As described above, according to this invention, the problems of pulse noise caused by the edge of the auxiliary magnetic pole can be solved by spatially varying the permeability of the auxiliary magnetic pole. Consequently, it is not necessary to retract the end of the auxiliary magnetic pole from the recording medium, nor to increase the length of the magnetic path, thus many more design choices are available. When the end of the auxiliary magnetic pole is positioned close to the recording medium, a more efficient magnetic head assembly is provided, and when the length of the magnetic path is reduced, high frequency characteristics are improved.

While the invention has been particularly shown and described with reference to a preferred embodiment thereof, it will be understood by those skilled in the art that various other changes in the form and details may be made therein without departing from the spirit and scope of the invention.

Having thus described my invention, what I claim as new, and desire to secure by Letters Patent is:

1. In a magnetic head assembly for perpendicular magnetic recording comprising a main magnetic pole, a coil magnetically connected to said main pole and an auxiliary pole placed on the same side of a magnetic medium as said main magnetic pole for forming a return path for a magnetic flux, the improvement wherein said auxiliary magnetic pole is formed of a magnetic material having the property that the permeability varies in the direction of relative movement between said magnetic head assembly and said magnetic medium with the permeability progressively increasing from each edge to the center of said auxiliary magnetic pole.

2. A magnetic head assembly for perpendicular magnetic recording as described in claim 1 wherein said magnetic material comprises an alloy in which the composition ratios of parts of said alloy are varied to produce said variation in the permeability of said auxiliary magnetic pole.

3. A magnetic head assembly for perpendicular magnetic recording as described in claim 1, wherein said auxiliary magnetic pole comprises laminated magnetic thin films in the direction of said relative movement.

4. A magnetic head assembly for perpendicular magnetic recording as described in claim 3, wherein the composition ratios of said magnetic thin films are varied according to the respective permeabilities.

5. A magnetic head assembly for perpendicular magnetic recording as described in claim 1 wherein the minimum distance between said auxiliary magnetic pole and said magnetic medium is substantially the same as the distance between said main magnetic pole and said magnetic medium.

6. A magnetic head assembly for perpendicular magnetic recording as described in claim 4 wherein the minimum distance between said auxiliary magnetic pole and said magnetic medium is substantially the same as the distance between said main magnetic pole and said medium.

* * * * *